US009157135B2

(12) United States Patent
Ikeda et al.

(10) Patent No.: US 9,157,135 B2
(45) Date of Patent: Oct. 13, 2015

(54) LEAD-FREE JOINTING MATERIAL AND METHOD OF PRODUCING THE SAME

(75) Inventors: Hiroki Ikeda, Himeji (JP); Katsu Yanagimoto, Himeji (JP); Noriaki Matsubara, Himeji (JP)

(73) Assignee: Sanyo Special Steel Co., Ltd., Himeji-shi, Hyogo-ken (JP)

( * ) Notice: Subject to any disclaimer, the term of this patent is extended or adjusted under 35 U.S.C. 154(b) by 0 days.

(21) Appl. No.: 12/517,433

(22) PCT Filed: Dec. 20, 2007

(86) PCT No.: PCT/JP2007/074555
§ 371 (c)(1),
(2), (4) Date: Jun. 3, 2009

(87) PCT Pub. No.: WO2008/078653
PCT Pub. Date: Jul. 3, 2008

(65) Prior Publication Data
US 2010/0089498 A1    Apr. 15, 2010

(30) Foreign Application Priority Data

Dec. 25, 2006 (JP) .................................. 2006-346942
Nov. 27, 2007 (JP) .................................. 2007-306122

(51) Int. Cl.
*B23K 35/24* (2006.01)
*C22C 28/00* (2006.01)
*B23K 35/26* (2006.01)
*C22C 13/00* (2006.01)

(52) U.S. Cl.
CPC .................. *C22C 28/00* (2013.01); *B23K 35/26* (2013.01); *B23K 35/262* (2013.01); *B23K 35/264* (2013.01); *C22C 13/00* (2013.01)

(58) Field of Classification Search
USPC .......................................................... 148/22
See application file for complete search history.

(56) References Cited

U.S. PATENT DOCUMENTS

2003/0224197 A1    12/2003    Soga et al.
2004/0050904 A1*    3/2004    Interrante et al. ............. 228/56.3
2004/0112478 A1*    6/2004    Bieler et al. .................. 148/538

FOREIGN PATENT DOCUMENTS

| EP | 730929 A2 * | 9/1996 | ............. B23K 35/30 |
| GB | 2138633 A * | 10/1984 | ............. H01L 21/60 |
| JP | 2002-261105 | 9/2002 | |
| JP | 2003-260587 | 9/2003 | |
| JP | 2003-311469 | 11/2003 | |
| JP | 2005-538851 | 12/2005 | |
| WO | 2004/026517 A2 | 4/2004 | |

* cited by examiner

*Primary Examiner* — Rebecca Lee
(74) *Attorney, Agent, or Firm* — The Webb Law Firm

(57) ABSTRACT

The present invention provides a high-temperature lead-free solder alloy which has no variation in strength of the soldered portion and has an excellent balance between strength and soldering properties, and a method for producing the alloy. The present invention relates to a lead-free jointing material made of an alloy of two elements A and B selected from elements other than Pb, wherein the element A has a melting point higher than a melting point of the element B, wherein the alloy is an alloy which has a room-temperature stable phase composed of the element B and a room-temperature stable phase $A_m B_n$ composed of the elements A and B (provided that m and n are specific numerals in accordance with an alloy constituting a stable phase at room temperature) and satisfies $A_x B_{1-x}$ (provided that $0<x<m/(m+n)$), and wherein the element A is supersaturatedly dissolved in the room-temperature stable phase composed of the element B.

3 Claims, 4 Drawing Sheets

BEFORE SOLDERING
(QUENCHED STATE)
● Sn
☆ $Cu_6Sn_5$

BEFORE SOLDERING
(QUENCHED STATE)
● Sn
☆ $Cu_6Sn_5$

AFTER SOLDERING

TEMPERATURE (°C)
BEFORE SOLDERING
(QUENCHED STATE)
●Sn : ENDOTHERMAL REACTION

TEMPERATURE (°C)
AFTER SOLDERING

BEFORE SOLDERING
(QUENCHED STATE)

AFTER SOLDERING

BEFORE SOLDERING
(QUENCHED STATE)

● Sn
× $MnSn_2$

AFTER SOLDERING

FIG. 5A
FIG. 5B
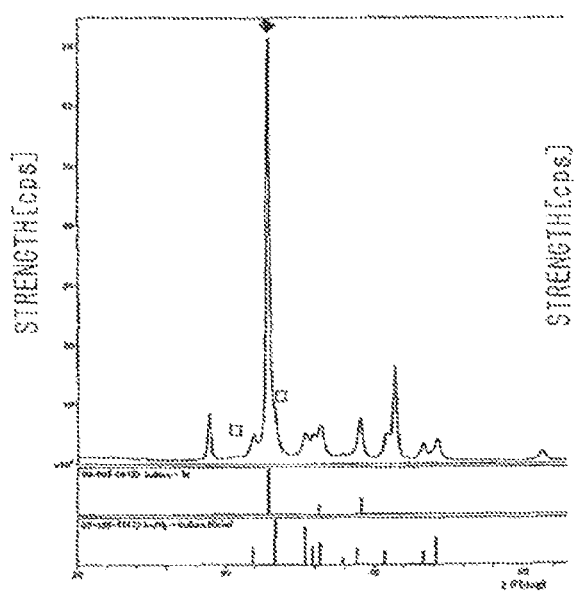
BEFORE SOLDERING
(QUENCHED STATE)
◆ In
☐ $In_{27}Ni_{10}$
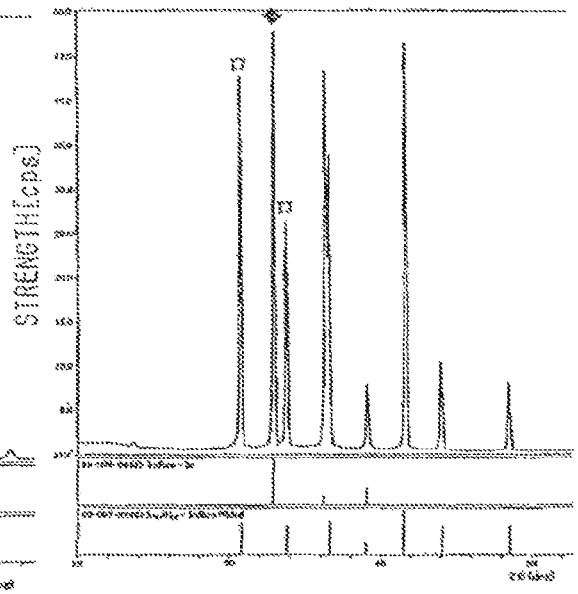
AFTER SOLDERING

BEFORE SOLDERING
(QUENCHED STATE)

◆ In
△ InMn₃

AFTER SOLDERING

BEFORE SOLDERING
(QUENCHED STATE)

■ Bi
○ BiNi₃

AFTER SOLDERING

LEAD-FREE JOINTING MATERIAL AND METHOD OF PRODUCING THE SAME

TECHNICAL FIELD

This invention relates to a lead-free jointing material and a method for producing the material.

BACKGROUND ART

In the past, in the process of manufacturing semiconductor devices, a two-step soldering process is carried out as a soldering method using a Sn—Pb based solder alloy, which is a typical solder joint material. Specifically, in the conventional soldering process, a Pb-5Sn solder (melting point: 310 to 314° C.) is primarily used in a conventional semiconductor device to conduct the soldering and, in the following reflow soldering for jointing the semiconductor per se to a substrate, a temperature-layered joint is used including a process of conducting the joint with a Sn-37Pb eutectic solder having a low melting point (melting point: 183° C.) so as not to melt the soldered portion already jointed in the semiconductor device.

On the one hand, in view of environmental problems, it is required in Restriction of the use of Certain Hazardous Substances in electrical and electronic equipment (RoHS) and the like to take steps for making solders Pb-free, and a Sn—Ag—Cu based eutectic alloy has been put into practical use as a reflow solder. In regard to high-temperature solders, on the other hand, an Au-20Sn solder (melting point: 280° C.) is known, but is hardly used since the Au-20Sn solder is inferior in cost and mechanical properties to Pb—Sn based solders. Since other component systems have not yet been put into practical use either, high-temperature solders containing Pb still remain exceptional in RoHS.

In regard to development of high-temperature solder alloys, for example, Japanese Patent Laid-Open Publication No. 2003-260587 describes a Sn—Cu based solder. This technique proposes a method which includes using a material prepared by mixing Sn powders and Cu powders together as a soldering paste and, upon high-temperature soldering, melting the Sn powders to contribute to the soldering as well as to react with the Cu powders to form a Sn—Cu intermetallic compound phase having a high melting point. This compound phase functions, upon reflowing, to retain the strength of the soldered portion without melting.

The above conventional techniques, however, have problems that a structure of an intermetallic compound phase formed in phase boundaries between the Sn powders and the Cu powders is formed on the surface of the Cu powder due to size of approximately 10 μm of the practically used powder to result in coarse structure and variation in strength and that a large amount of the Cu powder has to be used for increasing its strength to result in deterioration in the soldering properties provided by the Sn powder. Further, since formation of the intermetallic compounds relies upon a diffusion reaction between Sn in a molten liquid state and Cu in a solid state, it takes time to conduct this reaction due to a slow formation speed of a $Cu_6Sn_5$ intermetallic compound phase contributing to retention of strength, causing a disadvantage in the producing process.

SUMMARY OF THE INVENTION

The inventors have unexpectedly found that joint strength upon reflowing can be effectively maintained by using a jointing material prepared through supersaturated dissolution of an element A into a room-temperature stable phase composed of an element B in an alloy which is composed of two elements A and B, in which the element A has a melting point higher than that of the element B, and has a room-temperature stable phase composed of the element B and a room-temperature stable phase $A_mB_n$ composed of the elements A and B (provided that m and n are specific numerals in accordance with an alloy system) and by retaining the temperature at which the supersaturated solid solution is decomposed to precipitate the room-temperature stable phase $A_mB_n$ for melting and jointing.

It should be noted that "m and n are specific numerals in accordance with an alloy system" means numerals constituting a formulation ratio such that the element A and the element B maintain their states while retaining a constant ratio from a melting point or its vicinity to a room temperature in an equilibrium diagram. For example, in the case of the above-mentioned $Cu_6Sn_5$ intermetallic compound phase, the elements A and B are Cu and Sn respectively while m and n are 6 and 5 respectively. Combination of values of m and n per se in "specific numerals in accordance with an alloy system" can be understood by seeing an equilibrium diagram.

The outline is explained hereinbelow on the basis of a Sn—Cu based solder alloy as an example of the present invention. The Sn—Cu based alloy is quenched to produce an alloy mainly composed of a Sn phase in which Cu is forcibly dissolved. This Sn solid solution phase is molten at approximately 230° C. and is separated into two phases of a $Cu_6Sn_5$ phase and a Sn phase, which are stable phases at solidification after being soldered, while the $Cu_6Sn_5$ phase having a high melting point functions to retain the strength at reflow soldering. In this way, the present invention has been able to provide a high-temperature lead-free solder alloy which has no variation in strength of the soldered portion and has an excellent balance between strength and soldering properties, and a method for producing the alloy.

That is, the lead-free jointing material according to the present invention is made of an alloy of two elements A and B selected from elements other than Pb, wherein the element A has a melting point higher than a melting point of the element B, wherein the alloy is an alloy which has a room-temperature stable phase composed of the element B and a room-temperature stable phase $A_mB_n$ composed of the elements A and B (provided that m and n are specific numerals in accordance with an alloy constituting a stable phase at room temperature) and satisfies $A_xB_{1-x}$ (provided that $0<x<m/(m+n)$), and wherein the element A is supersaturatedly dissolved in the room-temperature stable phase composed of the element B.

Further, a preferred aspect of the present invention may include the lead-free jointing material, wherein the room-temperature stable phase $A_mB_n$ has a melting point higher than a melting point of the room-temperature stable phase composed of the element B.

The present invention also includes a method for producing the lead-free jointing material, comprising the step of rapidly solidifying a molten metal of the alloy having the composition of $A_xB_{1-x}$ to supersaturatedly dissolve the element A in the room-temperature stable phase composed of the element B.

As described above, the utilization of the configuration and quench of the alloy according to the present invention enables the alloy to be effectively applied to high-temperature soldering, in which conventional high-temperature solders such as Pb-5Sn were used. In particular, according to the present invention, in the soldering at a reflow temperature after the high-temperature soldering, it is possible to provide a Pb-free solder which retains the strength of a soldered portion. Further, the present invention is industrially useful in that it can provide a lead-free solder which has no variation in strength of the soldered portion, has an excellent balance between strength and soldering properties, and is excellent in economical efficiency and basic properties as a high-temperature solder.

Also, according to the present invention, combination of elements within the scope of the present invention makes it possible to provide a jointing material which is applicable to applications where retention of joint strength is desired in soldering at a temperature higher than the conventional soldering temperature or in reheating to a similar temperature after jointing at a temperature much lower than the conventional soldering temperature.

BRIEF DESCRIPTION OF THE DRAWINGS

FIGS. 5A and 5B are graphs respectively showing an X ray diffraction pattern before soldering (quenched state) and that after soldering in a composition example of an In—Ni based alloy according to the present invention.

DETAILED DESCRIPTION OF THE INVENTION

Figure 1A:
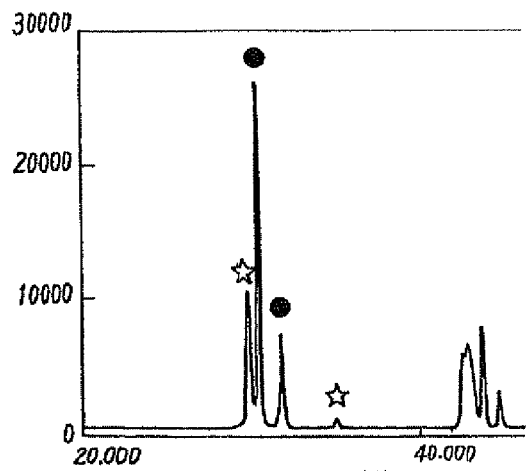
FIGS. 1A and 1B are graphs respectively showing an X ray diffraction pattern before soldering (quenched state) and that after soldering in a composition example of a Sn—Cu based alloy according to the present invention.

The present invention will be explained hereinbelow with reference to a Sn—Cu based solder alloy as an example of the present invention, but is not limited to the example.

The inventors have focused on a fact that a quenching process can produce an Sn solid solution which cannot exist from the viewpoint of an equilibrium diagram. Specifically, a Sn—Cu based alloy is produced by using metal Cu exhibiting an intermetallic compound $Cu_5Sn_5$ having a melting point not less than a reflow temperature at a position adjacent to Sn in the equilibrium diagram. In the case of using a method other than the quenching process, this alloy results in a two-phase structure of Sn and a $Cu_5Sn_5$ intermetallic compound in a ratio according to the equilibrium diagram depending on the Cu content.

However, it has been unexpectedly found that, when an alloy is produced by a quenching process such as an atomizing method or a melt-span method, Cu which should intrinsically form a $Cu_6Sn_5$ intermetallic compound is forcibly dissolved into the Sn to result in a phase similar to that of Sn as a Sn solid solution and therefore, in the quenched alloy, the amount of the $Cu_6Sn_5$ intermetallic compound being a high-melting-point phase is significantly reduced as compared to the theoretical amount calculated from the ratio between Sn and Cu in the alloy. In contrast, it has also been found that, since the Sn phase contributing to soldering exists as a Sn solid solution phase, its content is significantly increased as compared to the theoretical amount.

From these findings, the inventors have further found that the alloy produced through the above quenching process is mostly composed of a Sn solid solution phase and, if the alloy in this state is used for soldering as a solder material and is then cooled in a normal way, there is formed a solid state of an alloy that is prepared by using a method other than the quenching process.

This enables soldering on a temperature condition of a relatively low temperature (about 230° C.), and the solder can retain a good solid state even at a high temperature (about 400° C. or more) due to existence of the $Cu_6Sn_5$ phase.

As described above, when the soldering is conducted by using the alloy material of the present invention, a Sn solid solution phase existing in a large amount on soldering is molten at approximately 230° C., and this enables good soldering as in the case of using a normal Pb eutectic solder. Since the cooling after the soldering is not a quench, a high-melting-point phase ($Cu_6Sn_5$ intermetallic compound) in a theoretical amount calculated from the ratio between Sn and Cu in the alloy is formed after melting or when cooling.

According to the present invention, since the high-melting-point phase precipitates even from the inside of the powder, satisfactory soldering is possible even if the powder has a particle size more coarse than 10 μm, which is the particle size used in the conventional technique such as mixing a Sn powder with a Cu powder to react, for example, a particle size of 40 μm or less, which is the particle size of a standard solder powder.

Since the $Cu_6Sn_5$ intermetallic compound as described above is not molten at a reflow temperature of 250° C. or less, the initial soldered portion can retain a sufficient strength at reflow soldering. In addition, this compound phase becomes an extremely fine uniform structure which is solidified in accordance with the equilibrium diagram, after the substantially uniform structure which was quenched is completely molten. Since this structure is not a structure depending on diffusion of a liquid phase and a solid phase as in the conventional material, the compound phase is advantageous in that it has no variation in strength due to high formation rate of the compound and no residual Cu.

Further, in the case of the Sn—Cu based alloy, the Cu content in the alloy is preferably 14 to 45%. This is because the amount of the Sn solid solution contributing to soldering and that of the $Cu_6Sn_5$ intermetallic compound contributing to strength retention after soldering are optimally balanced. The inventors have studied in detail the range of the Cu content. As a result, when the Cu amount exceeds 45 atom %, the amount of the $Cu_6Sn_5$ intermetallic compound to be formed significantly increases with a reduced amount of the Sn solid solution contributing to the soldering even in the quenching method, making it difficult to conduct satisfactory soldering. It is therefore preferable that the upper limit of the Cu amount be 45 atom %. When the Cu amount is less than 14 atom %, it is difficult to secure a sufficient amount of the $Cu_6Sn_5$ intermetallic compound contributing to strength retention after the soldering. In view of the above, it is preferable that the Cu amount be set within the range of 14 to 45 atom %, more preferably 25 to 45 atom %.

This characteristic equally applies to the case where the element A is made Mn with the element B remaining as Sn. In a Sn—Mn based solder alloy, while $MnSn_2$ is formed as an intermetallic compound with a high melting point, supersaturated dissolution of Mn into Sn through a quenching process in an alloy composition having Mn in an amount of 15 to 35 atom % secures good soldering properties, suitably balances precipitation of a $MnSn_2$ phase contributing to strength retention after the soldering, and thus can retain the joint strength when being reheated to a similar temperature.

A similar finding applies when the element B is Bi having a melting point higher than 232° C., which is the melting point of Sn, or In having a melting point lower than 232° C. with the element A falling within the scope of the present invention is combined with each element. By combining these elements A and B, it is possible to provide a jointing material which is applicable to applications where retention of joint strength is desired in soldering at a temperature higher than the normal soldering temperature or in reheating to a similar temperature after jointing at a temperature much lower than the normal soldering temperature.

For example, Ni may be used as the element A when Bi having a melting point having 271° C. is used as the element B, while Ni, Mn or the like may be used as the element A when In having a melting point having 156° C. is used as the element B. Since melting point of brazing filler material affects easiness of jointing, it is preferable that the melting point of the element B be 810° C. or less in consideration.

In a similar way as described above, it is preferable that the Ni content be within a range of 5 to 29 atom % in order to employ an $In_{27}Ni_{10}$ intermetallic compound in an In—Ni based alloy, while it is preferable that the Mn content be within a range of 8 to 50 atom % in order to employ an $InMn_3$ intermetallic compound in an In—Mn based alloy. In addition, it is preferable that the Ni content be within a range of 5 to 25 atom % in order to employ a $Bi_3Ni$ intermetallic compound in a Bi—Ni based alloy.

The present invention will be in more detail explained with reference to a Sn—Cu based solder alloy as an example according to embodiments of the present invention.

In the Sn—Cu based alloy, a Sn-(14-45%)Cu alloy is produced through a quenching method, such as an atomizing method, a melt-span method and an In-Rotating-Water Spinning method. The configuration in this case is not particularly limited and may be in the form of powder, wire, bar, ribbon, plate or the like. In the Sn-(14-45%)Cu alloy within the composition range of the present invention, a Sn phase and a $Cu_6Sn_5$ intermetallic compound exist in a ratio in accordance with the equilibrium diagram unless quenched. However, the Sn solid solution in which a substantial amount of Cu is forcibly dissolved into the Sn phase by quenching is molten at approximately 230° C. substantially equal to the melting point of the original Sn phase, and thus contributes to satisfactory soldering.

While the quenching method includes atomizing method and melt-span method as described above, helium gas atomizing method and melt-span method are particularly effective as a quenching means. However, disk atomizing, argon atomizing, and nitrogen-gas atomizing are very effective as a means for mass production of solder powders, and the cooling rate depends on the particle size of a powder after atomized. Therefore, the fine particles produced by these methods are to fall within the scope of the present invention.

In addition, for example, a wire rod can be obtained by an In-Rotating-Water Spinning process. A bar can be obtained by an In-Rotating-Water Spinning process and a straightening or drawing process.

Figure 1B:
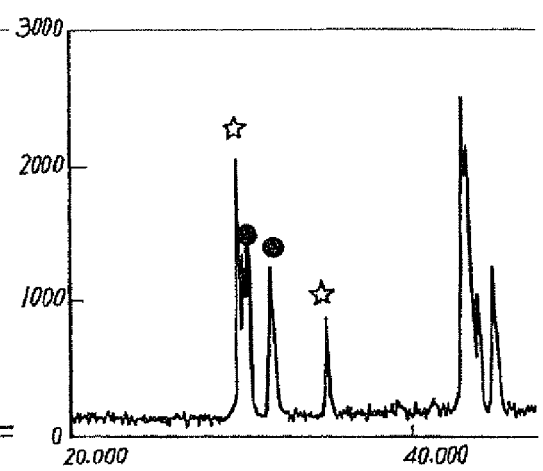

FIGS. 1A and 1B are graphs respectively showing an X ray diffraction patterns before soldering (quenching state) and that after soldering in a composition example of a Sn—Cu based alloy according to the present invention. As shown in FIGS. 1A and 1B, the peak of the Sn solid solution phase is higher than the peak of the $Cu_6Sn_5$ intermetallic compound phase before soldering, while this relationship of the peak heights are reversed after soldering. This indicates that Cu dissolved in the Sn phase is separated out when being molten for soldering, and reacts with Sn into the intermetallic compound phase.

Figure 2A:
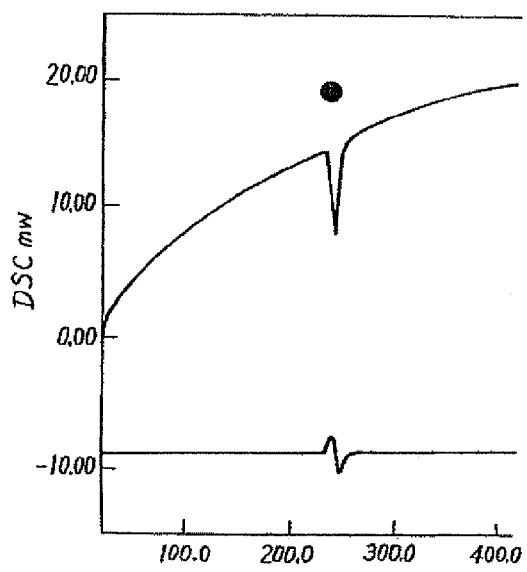
FIGS. 2A and 2B are graphs comparatively showing a DSC curve before soldering and that after soldering in a composition example of a Sn—Cu based alloy according to the present invention.
Figure 2B:
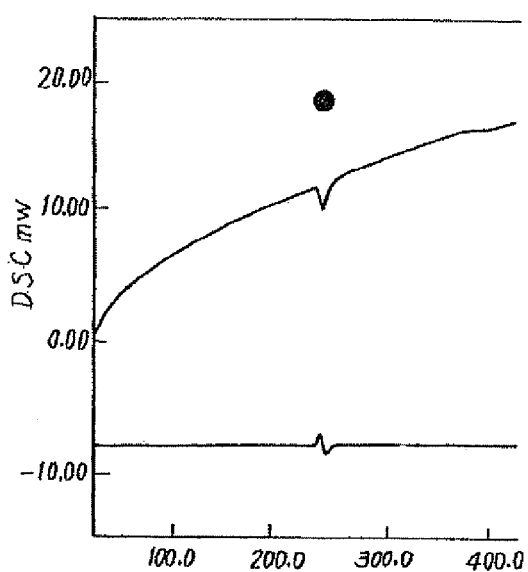

FIGS. 2A and 2B are graphs comparatively showing a DSC curve before soldering and that after soldering in a composition example of a Sn—Cu based alloy according to the present invention. As shown In FIGS. 2A and 2B, it is found that a clear endothermic reaction (melting) peak of Sn (Sn solid solution) is observed near 230° C. in an alloy in the state as quenched before soldering, while subjecting the alloy after soldering to the DSC again results in a very small melting peak of Sn, which causes high temperature strength reduction.

Figure 3A:
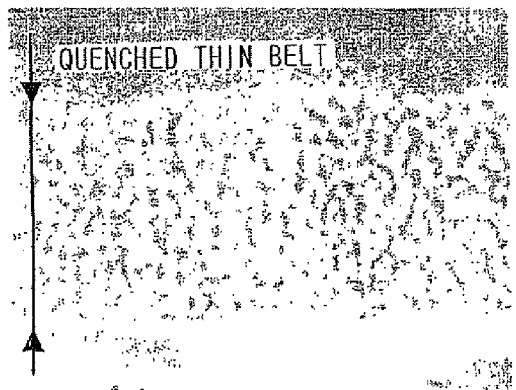
FIGS. 3A and 3B are micrographs respectively showing the structure before soldering and that after soldering in a composition example of a Sn—Cu based alloy according to the present invention.
Figure 3B:
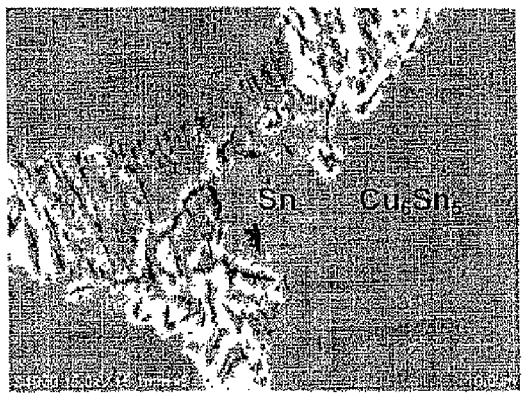

FIGS. 3A and 3B are micrographs respectively showing the structure before soldering and that after soldering in a composition example of a Sn—Cu based alloy according to the present invention. As shown in FIGS. 3A and 3B, the two-phase structure of Sn (Sn solid solution) and a $Cu_6Sn_5$ intermetallic compound cannot be clearly distinguished in the state as quenched before soldering, while the two-phase structure is clearly recognized after soldering, indicating that a large amount of $Cu_6Sn_5$ intermetallic compound has been formed.

Figure 4A:
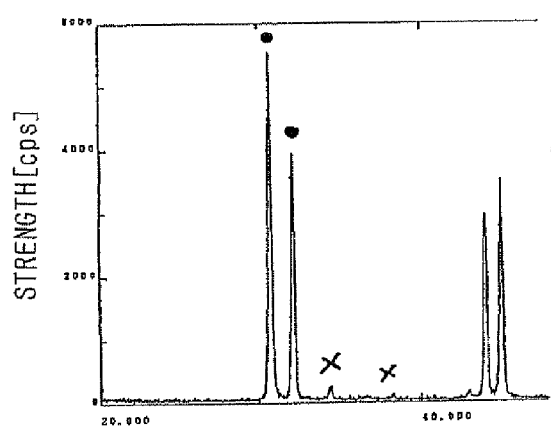
FIGS. 4A and 4B are graphs respectively showing an X ray diffraction pattern before soldering (quenched state) and that after soldering in a composition example of a Sn—Mn based alloy according to the present invention.
Figure 4B:
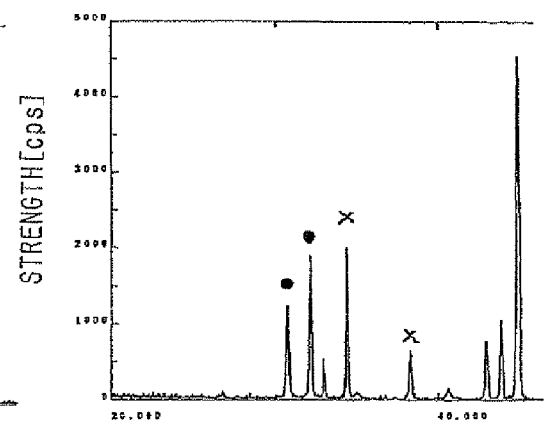
Figure 6A:
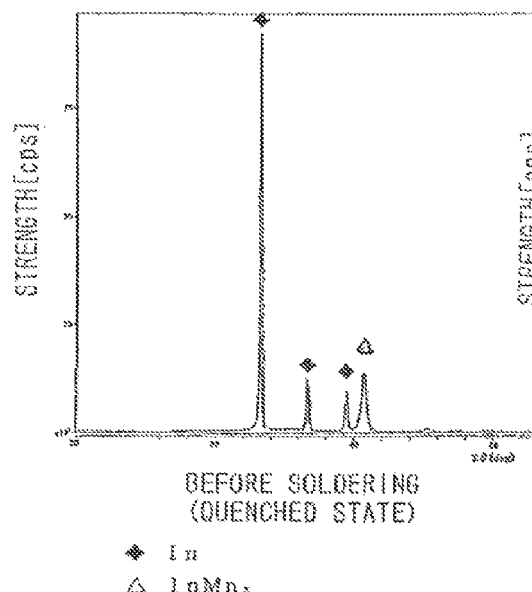
FIGS. 6A and 6B are graphs respectively showing an X ray diffraction pattern before soldering (quenched state) and that after soldering in a composition example of an In—Mn based alloy according to the present invention.
Figure 6B:
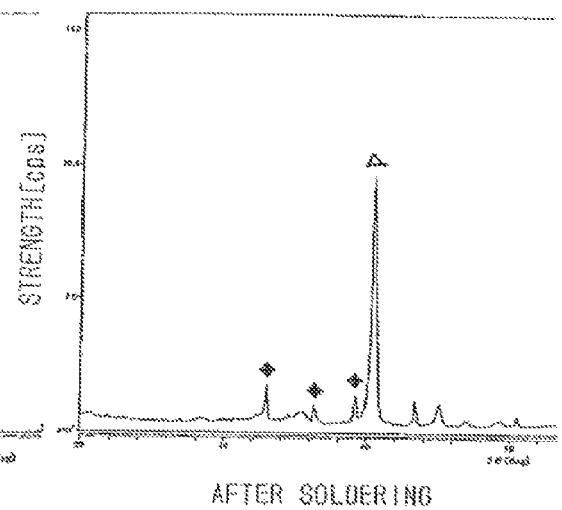
Figure 7A:
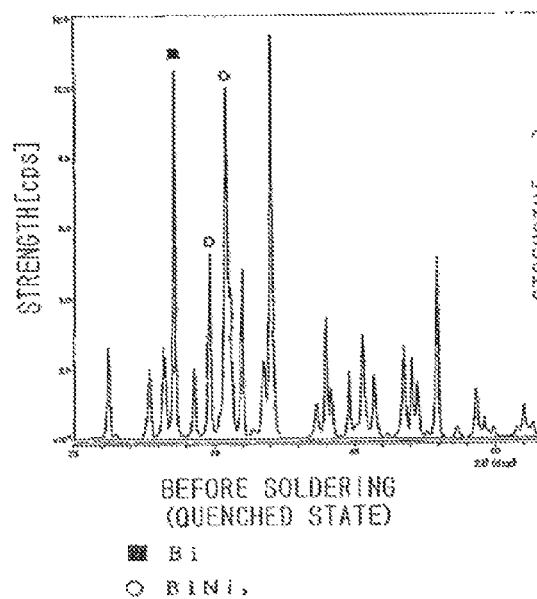
FIGS. 7A and 7B are graphs respectively showing an X ray diffraction pattern before soldering (quenched state) and that after soldering in a composition example of a Bi—Ni based alloy according to the present invention.
Figure 7B:
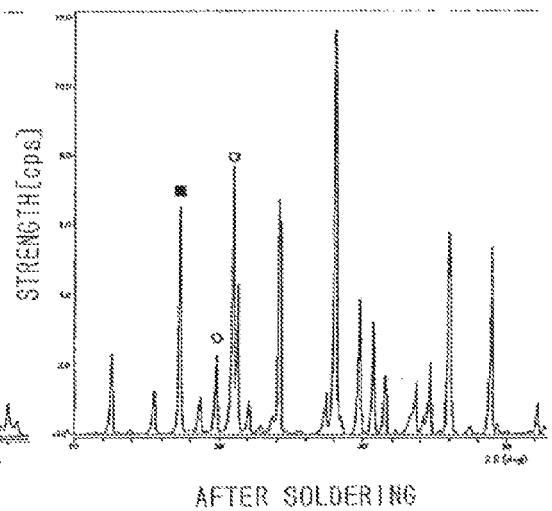

FIGS. 4A and 4B are graphs respectively showing an X ray diffraction pattern before soldering (quenching state) and that after soldering in a composition example of a Sn—Mn based alloy according to the present invention. As shown in FIGS. 4A and 4B, it is understood that the peak of the Sn solid solution phase is higher than the peak of the $MnSn_2$ intermetallic compound phase before soldering, while this relationship of the peak heights are reversed after soldering as in the Sn—Cu based alloy.

FIGS. 5A-5B, 6A-6B and 7A-7B are graphs each showing an X ray diffraction pattern before soldering (quenching state) and that after soldering in a composition example of each of an In—Ni based alloy, an In—Mn based alloy and a Bi—Ni based alloy. It is found that, before soldering, in an alloy with the element B being In, the peak of an In solid solution phase is higher than the peak of an $In_{27}Ni_{10}$ intermetallic compound phase with the element A being Ni and the peak of an $InMn_3$ intermetallic compound phase with the element A being Mn, but this relationship is reversed after soldering. Likewise, in a Bi—Ni based alloy with the element B being Bi, the peak of a Bi solid solution phase is higher than the peak of a $Bi_3Ni$ intermetallic compound phase, but this relationship is reversed after soldering. In this way, by applying the finding of the present invention to alloys other than the Sn—Cu based alloy, a high-melting-point intermetallic compound is formed at a soldering temperature from the supersaturated metallic phase, making it possible to achieve the characteristics intended in the present invention.

EXAMPLES

The present invention will be explained below in more detail with reference to examples.

Example 1

Table 1 a comparison table which shows wettability on soldering and strength of a soldered portion on reheating at 250° C. after soldering in relation to compositions of Cu—Sn based alloys. In the table, evaluation of wettability on soldering was conducted by confirming the change of a soldered portion after it was heated in a state that the solder has been applied on a Cu plate and following the below criteria:

A: Wettability was superior (solder was sufficiently expanded).

B. Wettability was good (solder was expanded).

C: Wettability was inferior (solder was not expanded from the applied state).

Evaluation of strength on reheating of 250° C. followed the below criteria:

A: Strength was superior.

B: Strength was good.

C: Strength was slightly inferior.

D: Strength was inferior.

TABLE 1

| No. | Composition (atom %) | | Wettability on Soldering | Strength on Reheating at 250° C. | Remarks |
|---|---|---|---|---|---|
| | Cu | Sn | | | |
| 1 | 15 | 85 | A | B | Working |
| 2 | 30 | 70 | A | A | Examples |
| 3 | 40 | 60 | A | A | |
| 4 | 45 | 55 | B | B | |
| 5 | 5 | 95 | A | D | Comp. |
| 6 | 11 | 89 | A | C | Examples |
| 7 | 55 | 45 | D | — | |
| 8 | 60 | 40 | D | — | |

NOTE)
The underlined figures fall outside the scope of the present invention.

As shown in Table 1, Nos. 1 to 4 are working examples while Nos. 5 to 8 are comparative examples.

Comparative Example No. 5 is inferior in strength on reheating at 250° C. because of a low Cu content. Comparative Example No. 6 is inferior in strength on reheating at 250° C. because of a low Cu content as in No. 5. Comparative Example No. 7 is inferior in wettability when soldered because of a high Cu content. Comparative Example No. 8 is inferior in wettability when soldered because of a much higher Cu content.

In contrast, it is found that in the working examples, which meet the conditions of the present invention, wettability on soldering and soldered portion strength on reheating at 250° C. after soldering are superior. However, in working example No. 1, strength on reheating at 250° C. was slightly lowered since the dissolution ratio of the $Cu_6Sn_5$ intermetallic compound phase, which contributes to strength retention, is small even in a quenched structure in view of constituent balance. In working example No. 4, the molten amount on soldering is slightly smaller, and results in a slight decrease in wettability and soldered portion strength on reheating at 250° C. after soldering, since the ratio of the Sn solid solution phase, which contributes to the good soldering properties, is small even in a quenched structure in view of constituent balance.

Example 2

Table 2 is a comparison table which shows wettability on soldering and soldered portion strength on reheating at 250° C. after soldering in relation to compositions of Sn—Mn based alloys. In the table, evaluation of wettability on soldering was made in the same way as in Example 1.

TABLE 2

| No. | Composition (atom %) | | Wettability on Soldering | Strength on Reheating of 250° C. | Remarks |
|---|---|---|---|---|---|
| | Mn | Sn | | | |
| 1 | 20 | 80 | A | A | Working |
| 2 | 30 | 70 | A | A | Examples |
| 3 | 5 | 95 | A | D | Comparative |
| 4 | 45 | 55 | B | C | Examples |
| 5 | 62 | 38 | D | — | |

NOTE:
The underlined figures fall outside the scope of the present invention.

As shown in Table 2, Nos. 1 and 2 are working examples while Nos. 3 to 5 are comparative examples.

Comparative Example No. 3 is inferior in strength on reheating at 250° C. because of a low Mn content. Comparative Example No. 4 is inferior in wettability on soldering and strength on reheating at 250° C. because of a high Mn content. Comparative Example No. 5 is inferior in wettability on soldering since the ratio of the Sn solid solution phase, which contributes to good soldering properties, is small even in a quenched structure in view of constituent balance. In contrast, it is found that in the working examples, which meets the conditions of the present invention, wettability on soldering and strength on reheating at 250° C. after soldering are superior.

Example 3

Table 3 is a comparison table which shows wettability on soldering and soldered portion strength on reheating at 250° C. after soldering in relation to compositions of In—Ni based alloys. In the table, evaluation of wettability on soldering was made in the same way as in Example 1.

TABLE 3

| No. | Composition (atom %) | | Wettability on Soldering | Strength on Reheating at 250° C. | Remarks |
|---|---|---|---|---|---|
| | Ni | In | | | |
| 1 | 10 | 90 | A | B | Working |
| 2 | 20 | 80 | A | B | Examples |
| 3 | 2 | 98 | A | C | Comparative |
| 4 | 45 | 55 | D | — | Examples |

NOTE:
The underlined figures fall outside the scope of the present invention.

As shown in Table 3, Nos. 1 and 2 are working examples while Nos. 3 and 4 are comparative examples.

Comparative Example No. 3 is good in wettability on soldering because of In, but is inferior in strength on reheating at 250° C. after soldering because of a low Ni content. Comparative Example No. 4 is inferior in wettability on soldering because of a high Ni content. In contrast, it is found that in the working examples, which meet the conditions of the present invention, wettability on soldering and strength on reheating at 250° C. after soldering are superior.

Example 4

Table 4 is a comparison table which shows wettability on soldering and soldered portion strength on reheating at 250° C. after soldering in relation to compositions of In—Mn based alloys. In the table, evaluation of wettability on soldering was made in the same way as in Example 1.

TABLE 4

| No. | Composition (atom %) | | Wettability on Soldering | Strength on Reheating at 250° C. | Remarks |
|---|---|---|---|---|---|
| | Mn | In | | | |
| 1 | 10 | 90 | A | B | Working |
| 2 | 25 | 75 | A | B | Examples |
| 3 | 45 | 55 | A | B | |
| 4 | <u>4</u> | <u>96</u> | A | D | Comparative |
| 5 | <u>67</u> | <u>33</u> | D | C | Examples |

NOTE:
The underlined figures fall outside the scope of the present invention.

As shown in Table 4, Nos. 1 to 3 are working examples while Nos. 4 and 5 are comparative examples.

Comparative Example No. 4 is good in wettability on soldering because of a low Mn content, but inferior in strength on reheating at 250° C. Comparative Example No. 5 is inferior in wettability on soldering because of a high Mn content. In contrast, it is found that in the working examples, which meet the conditions of the present invention, wettability on soldering and strength on reheating at 250° C. after soldering are superior.

Example 5

Table 5 is a comparison table which shows wettability on soldering and soldered portion strength on reheating at 300° C. after soldering in relation to compositions of Bi—Ni based alloys. It should be noted that, since Bi has a high melting point, the soldering temperature and the temperature on reheating were set at 300° C. In the table, evaluation of wettability on soldering was made in the same way as in Example 1.

TABLE 5

| No. | Composition (atom %) | | Wettability on soldering | Strength on Reheating at 300° C. | Remarks |
|---|---|---|---|---|---|
| | Ni | Bi | | | |
| 1 | 10 | 90 | A | B | Working |
| 2 | 20 | 80 | A | B | Examples |
| 3 | <u>2</u> | <u>98</u> | A | C | Comparative |
| 4 | <u>45</u> | <u>55</u> | D | — | Examples |

NOTE:
The underlined figures fall outside the scope of the present invention.

As shown in Table 5, Nos. 1 and 2 are working examples and Nos. 3 and 4 are comparative examples.

Comparative Example No. 3 is inferior in strength on reheating at 300° C. because of a low Ni content. Comparative Example No. 4 is inferior in wettability on soldering because of a high Ni content. In contrast, it is found that, in the working examples, which meet the conditions of the present invention, wettability on soldering and strength on reheating at 300° C. after soldering are superior.

The invention claimed is:

1. A lead-free jointing material for joining structures,
wherein the jointing material is made of an alloy of two elements A and B selected from elements other than Pb,
wherein element A has a melting point higher than a melting point of element B,
wherein the alloy is an alloy which has a room-temperature stable phase composed of element B and a room-temperature stable phase $A_m B_n$ composed of elements A and B (provided that m and n are specific numerals in accordance with an alloy constituting a stable phase at room temperature) and satisfies $A_x B_{1-x}$ (provided that $0<x<m/(m+n)$),
wherein element A is supersaturatedly dissolved in the room-temperature stable phase composed of element B;
wherein the alloy of two elements A and B is selected from the group consisting of Sn—Mn having Mn of 15 to 35 at %, In—Ni having Ni of 5 to 29 at %, In—Mn having Mn of 8 to 50 at %, and Bi—Ni having Ni of 5 to 25 at %; and
wherein the lead-free jointing material is separate from the structures to be joined with the jointing material.

2. The lead-free jointing material according to claim 1, wherein the room-temperature stable phase $A_m B_n$ has a melting point higher than a melting point of the room-temperature stable phase composed of element B.

3. The lead-free jointing material according to claim 1, wherein the lead-free jointing material is in the form of powder, wire, bar, ribbon or plate.

* * * * *